United States Patent Office 2,978,490
Patented Apr. 4, 1961

2,978,490

N,N-DINITRO DICARBAMATES

Milton B. Frankel, Pasadena, Calif., assignor to Aerojet-General Corporation, Azusa, Calif., a corporation of Ohio No Drawing. Filed Jan. 3, 1955, Ser. No. 479,657

18 Claims. (Cl. 260—482)

This invention relates to new compositions of matter and a method for their preparation. In particular, it relates to N,N'-dinitro dicarbamates having the general formula:

$$R-\underset{\underset{NO_2}{|}}{N}-\underset{\underset{O}{\|}}{C}-O-A-O-\underset{\underset{O}{\|}}{C}-\underset{\underset{NO_2}{|}}{N}-R'$$

wherein R and R' are nitroalkyl radicals and A is a nitroalkylene or alkynylene radical.

The compounds of this invention are prepared by reacting a dicarbamate with nitric acid, in accordance with the general reaction scheme set forth below:

$$R-\underset{\underset{H}{|}}{N}-\underset{\underset{O}{\|}}{C}-O-A-O-\underset{\underset{O}{\|}}{C}-\underset{\underset{H}{|}}{N}-R'+HNO_3 \longrightarrow$$

$$R-\underset{\underset{NO_2}{|}}{N}-\underset{\underset{O}{\|}}{C}-O-A-O-\underset{\underset{O}{\|}}{C}-\underset{\underset{NO_2}{|}}{N}-R$$

wherein R, R', and A are as defined above.

As a matter of convenience, the reaction is usually conducted in the presence of an alkanoic anhydride.

The dicarbamates useful as starting materials are readily prepared by the addition reaction of nitro isocyanates with nitro diols, as disclosed in my copending application Serial No. 479,655, filed January 3, 1955, and with alkynyl diols, as disclosed in my copending application Serial No. 479,656, filed January 3, 1955.

To more clearly illustrate my invention, the following examples are presented. It should be understood, however, that these examples are presented merely as a means of illustration and are not intended to limit the scope of the invention in any way.

EXAMPLE I

*Preparation of N,N'-dinitro-N,N'-bis-(3,3,3-trinitropropyl)-2,2-dinitropropylene dicarbamate*

0.5 gm. of N,N'-bis(3,3,3-trinitropropyl)-2,2-dinitropropylene dicarbamate was dissolved in 10 ml. acetic anhydride. While maintaining the temperature at about 5–10° C., the solution was added to 10 ml. 100% nitric acid and stirred for 20 minutes. The solution was then poured over ice. The resulting white precipitate was washed with water and recrystallized from chloroform in 89.7% yield, M.P. 94–96° C. The elemental analysis of the product is as follows:

Calculated for $C_{11}H_{12}N_{12}O_{24}$: percent C, 18.97; percent H, 1.74; percent N, 24.14. Found: percent C, 19.29; percent H, 2.00; percent N, 24.21.
Calculated Heat of Combustion: 1784 cal./gm. Found: 1834 cal./gm.
Calculated Lead Block Value: 164 T.N.T.=100.
Calculated Ballistic Mortar Value: 132 T.N.T.=100.

EXAMPLE II

*Preparation of N,N'-dinitro-N,N'-bis(3,3-dinitrobutyl)-2,2-dinitropropylene dicarbamate*

While maintaining the temperature at 0–5° C., 10 ml. of acetic anhydride was added to 10 ml. of 100% nitric acid. N,N'-bis(3,3-dinitrobutyl)-2,2-dinitropropylene dicarbamate was added portionwise to the solution. The solution was then stirred for 20 minutes at 5–10° C. and then poured over ice. The resulting white solid was washed with water and recrystallized from ethylene dichloride in 88% yield, M.P. 117–118° C. The elemental analysis of the product is as follows:

Calculated for $C_{13}H_{18}N_{10}O_{20}$: percent C, 24.61; percent H, 2.86; percent N, 22.08. Found: percent C, 24.78; percent H, 2.90; percent N, 21.87.
Calculated Lead Block Value: 119 T.N.T.=100.
Calculated Ballistic Mortar Value: 128 T.N.T.=100.

EXAMPLE III

*Preparation of N,N'-dinitro-N,N'-bis(3,3,3-trinitropropyl)-2-butyne dicarbamate*

0.5 gm. of N,N'-bis(3,3,3-trinitropropyl)-2-butyne dicarbamate was dissolved in 10 ml. acetic anhydride. While maintaining the temperature at about 5–10° C., the solution was added to 10 ml. 100% nitric acid and stirred for 20 minutes. The solution was then poured over ice. The resulting white precipitate was washed with water and recrystallized from chloroform in 60% yield, M.P. 115–116° C. The elemental analysis of the product is as follows:

Calculated for $C_{12}H_{12}N_{10}O_{20}$: percent C, 23.38; percent H, 1.96; percent N, 22.73. Found: percent C, 23.61; percent H, 2.19; percent N, 22.60.
Calculated Lead Block Value: 137 T.N.T.=100.
Calculated Ballistic Mortar Value: 134 T.N.T.=100.

The reaction is preferably run at temperatures in the range of from about 0° to 15° C. The reaction can be performed at higher temperature; however, it is preferred to run the reaction at reduced temperatures to permit better control of the reaction rate.

A wide variety of compounds can be prepared in accordance with the procedure set forth in the above examples. N,N'-dinitro-N,N'-bis(3,3,3-trinitropropyl)-2-nitropropylene dicarbamate, N,N'-dinitro-N,N'-bis(3,3-dinitrohexyl)-2,2-dinitropropylene dicarbamate, N,N'-dinitro-N,N'-bis(2,2,4,4-tetranitropentyl)-2,2-dinitropropylene dicarbamate, N,N'-dinitro-N,N'-bis(3,3,3-trinitropropyl)-3-hexyne dicarbamate, N,N'-dinitro-N,N'-(3,3-dinitrobutyl)-2-butyne dicarbamate, and N,N'-dinitro-N-3,3-dinitrobutyl-N'-3,3,3-trinitropropyl butyne dicarbamate are prepared by reacting nitric acid respectively with: N,N'-bis(3,3,3-trinitropropyl)-2-nitropropylene dicarbamate, N,N'-bis(3,3-dinitrohexyl)-2,2-dinitropropylene dicarbamate, N,N'-bis(2,2,4,4-tetranitropentyl)-2,2-dinitropropylene dicarbamate, N,N'-bis(3,3,3-trinitropropyl)-3-hexyne dicarbamate, N,N'-bis(3,3-dinitrobutyl)-2-butyne dicarbamate, and N-3,3-dinitrobutyl-N'-3,3,3-trinitropropyl butyne dicarbamate.

It is apparent that any member of the disclosed series of N,N'-dinitro dicarbamates can be prepared by merely reacting an appropriate dicarbamate with nitric acid, according to the teachings of this invention.

The nitro compounds of this invention are useful as high explosives and can be used in any conventional explosive missile, projectile, rocket, or the like, as the main explosive charge. An example of such a missile is disclosed in United States Patent No. 2,470,162, issued May 17, 1949. One way of using the high explosives of this invention in a device such as that disclosed in United States Patent No. 2,470,162, is to pack the crystalline explosive in powder form into the warhead of the missile. Alternatively, the crystals can be first pelletized and then packed. A charge thus prepared is sufficiently insensitive to withstand the shock entailed in the ejection of a shell from a gun barrel or from a rocket launching tube under the pressure developed from ignition of a propellant charge, and can be caused to explode on operation of an impact- or time fuse-mechanism firing a detonating explosive such as lead azide or mercury fulminate.

I claim:

1. As compositions of matter, N,N'-dinitro dicarbamates having the general formula:

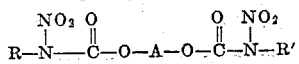

wherein R and R' are lower nitroalkyl radicals and A is a radical selected from the group consisting of lower nitroalkylene and lower alkylene radicals.

2. As compositions of matter, N,N'-dinitro dicarbamates having the general formula:

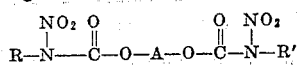

wherein R and R' are lower nitroalkyl radicals and A is a lower nitroalkylene radical.

3. As compositions of matter, N,N'-dinitro dicarbamates having the general formula:

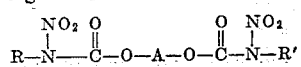

wherein R and R' are lower nitroalkyl radicals and A is a lower alkylene radical.

4. As a composition of matter, N,N'-dinitro-N,N'-bis(3,3,3-trinitropropyl)-2,2-dinitropropylene dicarbamate having the structural formula:

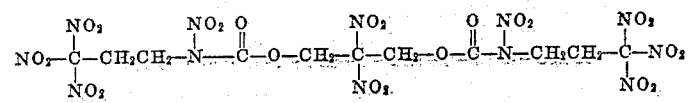

5. As a composition of matter, N,N'-dinitro-N,N'-bis(3,3-dinitrobutyl)-2,2-dinitropropylene dicarbamate having the structural formula:

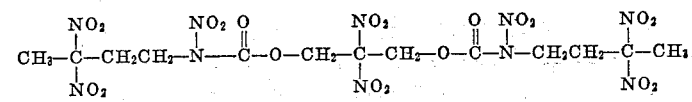

6. As a composition of matter, N,N'-dinitro-N,N'-bis(3,3,3-trinitropropyl)-2-butyne discarbamate having the structural formula:

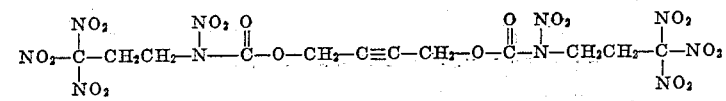

7. As a composition of matter, N,N'-dinitro-N,N'-bis(3,3,3-trinitropropyl)-2-nitropropylene dicarbamate having the structural formula:

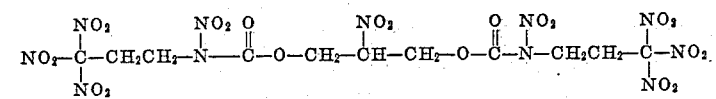

8. As a composition of matter, N,N'-dinitro-N,N'-bis(3,3-dinitrohexyl)-2,2-dinitropropylene dicarbamate having the structural formula:

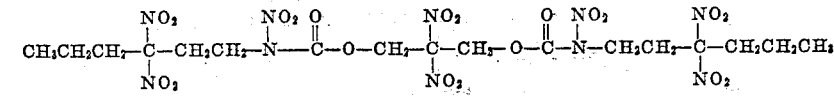

9. The method of preparing N,N'-dinitro dicarbamates having the general formula:

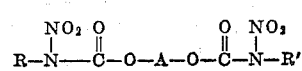

which comprises reacting nitric acid with a dicarbamate having the general formula:

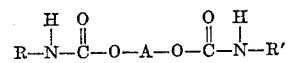

wherein R and R' are lower nitroalkyl radicals and A is a radical selected from the group consisting of lower nitroalkylene and lower alkynylene radicals.

10. The method of claim 9 wherein the reaction is conducted in an alkanoic anhydride media.

11. The method of preparing N,N'-dinitro dicarbamates having the general formula:

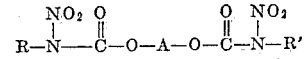

which comprises reacting nitric acid with a dicarbamate having the general formula:

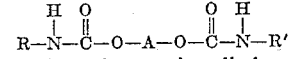

wherein R and R' are lower nitroalkyl radicals and A is lower nitroalkylene radical.

12. The method of preparing N,N'-dinitro dicarbamates having the general formula:

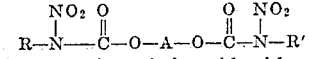

which comprises reacting nitric acid with a dicarbamate having the general formula:

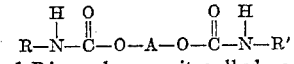

wherein R and R' are lower nitroalkyl radicals and A is a lower alkynylene radical.

13. The method of preparing N,N'-dinitro-N,N'-bis-(3,3,3-trinitropropyl)-2,2-dinitropropylene dicarbamate which comprises reacting nitric acid with N,N'-bis(3,3,3-trinitropropyl)-2,2-dinitropropylene dicarbamate.

14. The method of preparing N,N'-dinitro-N,N'-bis-(3,3-dinitrobutyl)-2,2-dinitropropylene dicarbamate which comprises reacting nitric acid with N,N'-bis(3,3-dinitrobutyl)-2,2-dinitropropylene dicarbamate.

15. The method of preparing N,N'-dinitro-N,N'-bis-3,3,3-trinitropropyl)-2-butyne dicarbamate which comprises reacting nitric acid with N,N'-bis(3,3,3-trinitropropyl)-2-butyne dicarbamate.

16. The method of preparing N,N'-dinitro-N,N'-bis-(3,3,3-trinitropropyl)-2-nitropropylene dicarbamate which comprises reacting nitric acid with N,N'-bis(3,3,3-trinitropropyl)-2-nitropropylene dicarbamate.

17. The method of preparing N,N'-dinitro-N,N'-bis- (3,3-dinitrohexyl) - 2,2 - dinitropropylene dicarbamate which comprises reacting nitric acid with N,N'-bis(3,3-dinitrohexyl)-2,2-dinitropropylene dicarbamate.

18. The method of preparing N,N'-dinitro dicarbamates having the general formula:

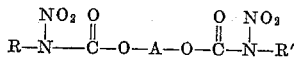

which comprises reacting nitric acid with a dicarbamate having the general formula:

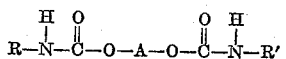

wherein R and R' are lower nitroalkyl radicals and A is a radical selected from the group consisting of lower nitroalkylene and lower alkynylene radicals at a temperature of from about 0° C. to about 15° C.

References Cited in the file of this patent

Curry et al.: J. Am. Chem. Soc. 73, 5043-6 (1951).
Gaylord: J. of Organic Chemistry 20, 546-548 (1955).